United States Patent [19]

Pillsbury

[11] Patent Number: 4,960,056
[45] Date of Patent: Oct. 2, 1990

[54] SLAG PROCESSING SYSTEM FOR DIRECT COAL-FIRED GAS TURBINES

[75] Inventor: Paul W. Pillsbury, Winter Springs, Fla.

[73] Assignee: The United States of America as represented by the United States Department of Energy, Washington, D.C.

[21] Appl. No.: 404,396

[22] Filed: Sep. 8, 1989

[51] Int. Cl.$^5$ .............................................. F23B 7/00
[52] U.S. Cl. .................................. 110/233; 60/39.464; 110/165 R; 110/171
[58] Field of Search .............. 110/165 R, 165 A, 171, 110/233, 264, 341, 347; 60/39.464, 39.02

[56] References Cited

U.S. PATENT DOCUMENTS

| | | | |
|---|---|---|---|
| 4,472,171 | 9/1984 | Broderick | 48/62 |
| 4,494,971 | 1/1985 | Monteyne et al. | 65/19 |
| 4,550,563 | 11/1985 | Marchand | 60/39.464 X |
| 4,722,483 | 2/1988 | Saville et al. | 241/23 |
| 4,758,260 | 7/1988 | Geropp et al. | 65/19 |
| 4,768,446 | 9/1988 | Wilkes et al. | 110/233 X |
| 4,800,825 | 1/1989 | Kuenzly | 110/345 |

OTHER PUBLICATIONS

Diehl, et al., "Development of an Advanced Coal-Fired Gas Turbine Combustor", AVCO Research Laboratory, HT. Engine Contractors' Conference, (Jun. 14, 1988).
Loftus et al., "The Use of 3-D Numerical Modelling in the Design of a Gas Turbine Coal Combustor," AVCO Research Laboratory, presented at the Winter Annual Meeting of the American Society of Mechanical Engineers (Dec. 1988).
Chatwani, et al., "Fundamental Modelling of Pulverized Coal and Coal-Water Slurry Combustion in a Gas Turbine Combustor", *Proceedings, The Third Chemical Congress of North America*, Toronto (Jun. 1988).
Bannister, et al., *Westinghouse Advanced Coal-Fueled Gas Turbine Program* (undated).
Diehl, et al., "A Direct Coal-Fired 80MW Utility Combustion Turbine-Status Report", *A.S.M.E. Gas Turbine Meeting*, Toronto (Jun. 1989).
Smith, ed., "Large 60 Hz Model V84 Gas Turbine Launched by KWU", *Modern Power Systems*, pp. 39-47 (Sep. 1983).
Babacock and Wilcox, *Steam: Its Generation and Use*, 38th Ed., (1975), pp. 10-18 and 15-10.
B. Skrotzki and W. Bopat, *Power Station Engineering* McGraw Hill (1960), p. 145.

*Primary Examiner*—Edward G. Favors
*Attorney, Agent, or Firm*—K. Bach

[57] ABSTRACT

Direct coal-fired gas turbine systems and methods for their operation are provided by this invention. The systems include a primary combustion compartment coupled to an impact separator for removing molten slag from hot combustion gases. Quenching means are provided for solidifying the molten slag removed by the impact separator, and processing means are provided forming a slurry from the solidified slag for facilitating removal of the solidified slag from the system. The released hot combustion gases, substantially free of molten slag, are then ducted to a lean combustion compartment and then to an expander section of a gas turbine.

21 Claims, 1 Drawing Sheet

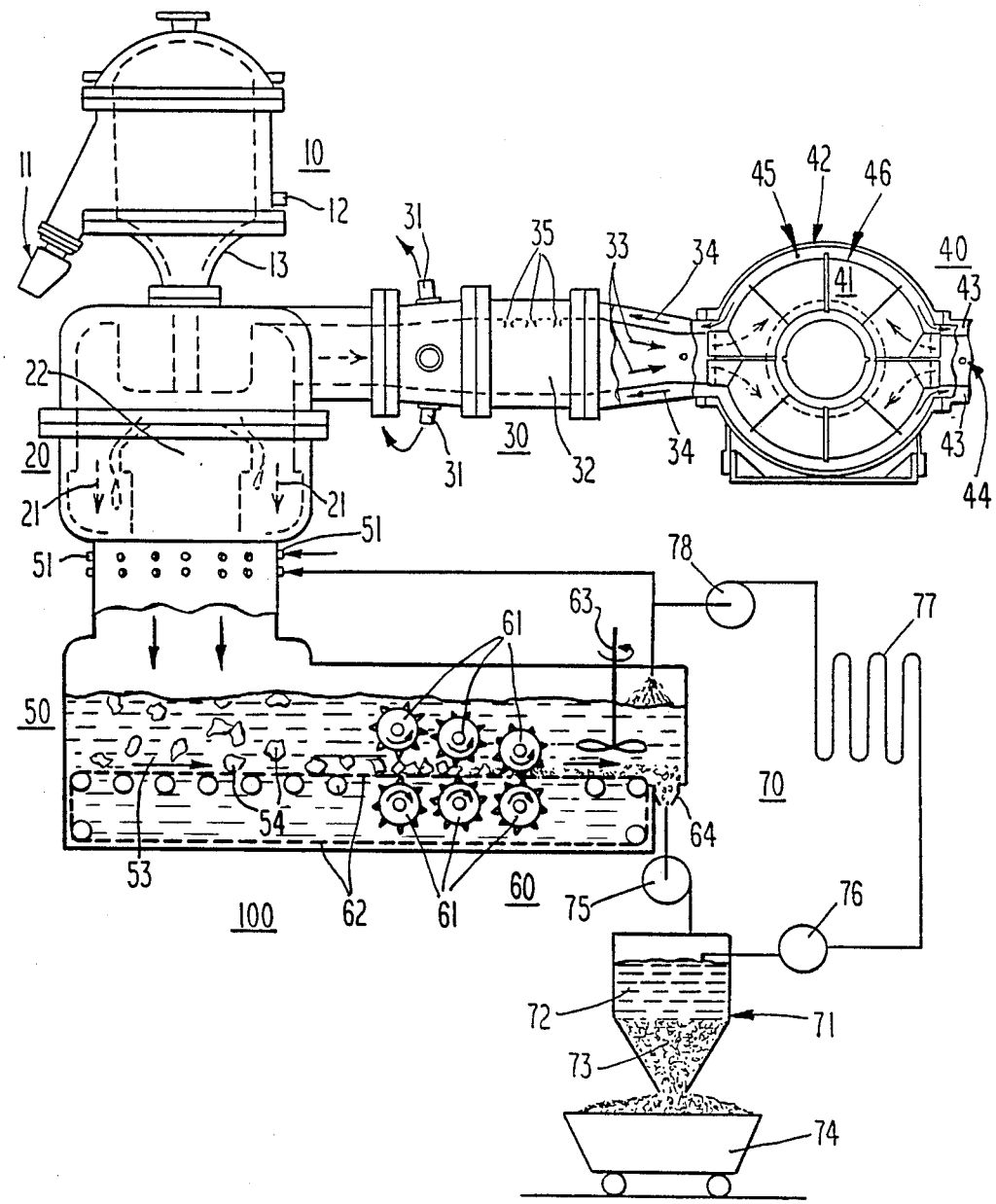

SLAG PROCESSING SYSTEM FOR DIRECT COAL-FIRED GAS TURBINES

FIELD OF THE INVENTION

This invention relates to techniques for removing waste from direct coal-fired gas turbine systems, and more particularly, to specific processing techniques for removing slag from such turbines during their operation.

BACKGROUND OF THE INVENTION

Recently, much effort has been directed to developing advanced direct coal-fired gas turbine systems for electric utility applications. One approach is based on a multi-stage, slagging combustor with specified emissions control. Instead of requiring a low-ash, highly beneficiated coal, the slagging combustor concept allows the use of a raw or moderately cleaned, utility grade coal of higher ash content, thus maintaining a lower fuel cost. The economics of such a design are considered more favorable than conventional pulverized coal steam plants.

The success of direct coal-fired combustion systems relies heavily on the effectiveness of the slagging combustor itself. The slagging combustor is a modular unit with three principle stages. The first stage is the primary combustion zone or compartment. Coal and preheated compressed air, enter the primary zone coaxially through a plurality of injection nozzles which are equally spaced around the combustion chamber. This coaxial injection promotes intense air/coal mixing and rapid particle heat-up/devolatilization, which minimizes carbon burn-out time.

The incoming coal-air jets converge at the combustor center line and form one vertical jet which impacts the combustor dome. This forms a toroidal vortex which provides the mechanisms for flame stabilization and centrifugal separation of larger ash and slag particles. This separated ash and slag forms a stable flowing layer on the combustor walls. The vertical geometry of this stage allows gravity to assist in the removal of the molten slag.

Fuel rich conditions in the primary combustion zone inhibit $NO_x$ formation from fuel bound nitrogen. They also provide the necessary reducing conditions for removal and capture of sulfur. The sulfur sorbent, limestone, dolomite, hematite, or magnetite, is counter-flow injected into the downstream end of the primary zone. The first stage is designed for a coal particle residence time of about 100 ms (for 75 micron sized particles).

The second stage of the direct coal-fired combustor is an efficient impact separator which is closely coupled to the first stage. The impact separator removes particulates carried over with the gas from the primary zone, whether they are sorbent or fine particles of ash. To meet government regulations regarding particulate standards, a slagging cyclone separator has also been suggested to be combined with the impact separator. See Diehl, et al. "Development of an Advanced Coal-Fired Gas Turbine Combustor" AVCO Research Laboratory, Heat Engine Contractors, Conference, June 14, 1988; Loftus, et al. "The Use of 3-D Numerical Modelling in the Design of a Gas Turbine Coal Combustor", AVCO Research Laboratory, presented at the Winter Annual Meeting of the American Society of Mechanical Engineers (December, 1988), which are hereby incorporated by reference.

For slagging to occur, temperatures throughout the combustion chamber, and particularly at the walls, must not fall below about 2,600° F., 1427° C., depending upon the type of coal. These temperatures are achieved by employing a proper air to fuel ratio, by providing adequate design for refractory walls, and sufficient residence time for the reacting coal to air mixture.

In the third stage of the slagging combustor, combustion completion is accomplished and the combustion gases are tempered to meet turbine inlet requirements. This stage preferably consists of a single module with a pressure shell, which construction is also employed in the first two stages. To prevent the possibility of refractory particles in the exhaust system passing to the turbine, this section has no refractory lining. Combustion and dilution air is introduced through two rows of injection tubes with approximately sixteen tubes per row circumferentially spaced.

While for the most part, the early designs of direct coal-fired gas turbine systems have showed much promise, there is a current need for an effective method for removing molten or solidified slag from the bottom of the impact separator. Since gas turbine systems often operate at high pressures customary for the industry, i.e., 10, 12, or 14 atmospheres, any deslagging procedure should avoid system pressure losses, but, more importantly, must move the slag from a high-pressure zone to atmospheric pressure without becoming plugged-up, and without releasing any significant volume of high-pressure combustion gases or air to the atmosphere. Such a system would also be required to move a high volume of slagging products out of the gas turbine within a relatively short time.

SUMMARY OF THE INVENTION

A direct coal-fired gas turbine system of the type having a primary combustion compartment coupled to an impact separator for removing molten slag from hot combustion gases is provided by this invention. The system includes quenching means for solidifying the molten slag removed from the impact separator and processing means for forming a slurry from the solidified slag for facilitating removal of the solidified slag from the system. The hot combustion gases remaining in the system are ducted to an expander section of the gas turbine.

This invention also includes a method for removing slag from a direct coal-fired gas turbine system including the steps of quenching molten slag removed by an impact separator with water and forming a slurry from the solidified slag for facilitative removal from the system.

Accordingly, means for continuously removing coal ash and slag from a direct coal-fired gas turbine system are provided by this invention. The novel apparatus and methods provide expeditious removal of waste and contaminants that must be separated from the hot qases in order to avoid damaging costly turbine components. The processes and the systems disclosed further minimize pressurized gas and air loss from the system in order to avoid interference with overall system efficiency. Recirculation means are also provided by this invention for reusing some of the large quantities of water necessary to quench and/or slurry slag.

BRIEF DESCRIPTION OF THE FIGURES

The accompanying drawing illustrates a complete embodiment of the invention according to a preferred mode for the practical application of the principles thereof, and in which:

FIG. 1 is a diagrammatic view of a direct coal-fired gas turbine system including an impact slag separator, quenching and processing mechanisms for solidifying molten slag and forming a slurry therefrom, and a settling tank and recycling system for conserving water.

DESCRIPTION OF THE INVENTION

According to this invention, a direct coal-fired gas turbine system of the type having a primary combustion compartment coupled to an impact separator for removing molten slag from hot combustion gases is provided. The system includes quenching means for solidifying the molten slag removed by the impact separator and processing means for forming a slurry from the solidified slag for facilitating removal of the solidified slag from the system. The remaining hot combustion gases are then ducted to an expander section of the gas turbine for safe and efficient use.

In a more detailed embodiment of the invention, a direct coal-fired gas turbine system is provided which includes a primary combustion zone for burning coal in the presence of compressed air to produce molten slag and hot combustion gases and an impact separator for substantially removing the molten slag from the hot combustion gases. The system further includes quenching means comprising a spray nozzle for applying a water spray to the molten slag for aiding in the solidification of the molten slag, and a water bath for receiving at least the solidified molten slag. This embodiment further includes processing means for forming a slurry from the solidified slag for facilitating removal of the solidified slag from the system. This processing means includes a crushing mechanism for crushing the solidified slag into slag particles, and means for transferring the solidified slag from the water bath to the crushing mechanism.

This invention also provides a method for removing slag from a direct coal-fired gas turbine system of the type having a primary combustion compartment coupled to an impact separator. This method includes quenching the molten slag removed by the impact separator with water and forming a slurry from the solidified slag for facilitated removal of the solidified slag from the system.

Referring now to FIG. 1 a preferred direct coal-fired gas turbine system 100 will now be described. The overall system 100 includes a primary combustion zone (rich) 10, impact slag separator region 20, final combustion zone (lean) 30, combustion turbine 40, quenching apparatus 50, slurry processing apparatus 60, and recirculation system 70.

The primary combustion zone 10 includes injector 11 for primary combustion of air and coal. It also may include sorbent ports 12 for receiving sulfur sorbent, e.g., limestone, dolomite etc. The injector 11 preferably is one of four separate coaxial injection nozzles equally spaced around the periphery of the combustor. Coaxial injection promotes intense mixing of the reactants and rapid coal particle heat-up and devolatilization. The inflowing jets coalesce near the combustor center line and form a vertically directed jet, which impinges the stagnation region at the top of the combustor dome. The reacting flow is turned to form a radial wall jet, which in turn, forms a toroidal vortex in the corner of the dome. The toroidal vortex mixes the incoming coal and air flow with hot combustion products, thus providing for favorable ignition characteristics and promoting highly efficient, rapid and stable combustion. Jet impact and radial acceleration of the recirculating vortex flow in the upper dome is the prime mechanism for inertial separation of particles from the combustion gases onto the slagging walls. A small amount of wall burning of large char particles deposited on the walls with the ash material usually occurs. The combustion products leave the dome as a subsonic plug flow. See Loftus, et al. p. 4–5.

The combustor second stage consists of an impact separator region 20, which is closely integrated to the primary zone 10. The fuel-rich gases exiting the primary combustion zone 10 are accelerated through a nozzle 13 and directed at a collector plate 22, or center body, which is perpendicular to the flow. Particles which are too large to follow the gas stream-lines, impinge on the collector plate 22 and are separated from the gas stream. The slag 21 flows down the collector plate 22, while the gas exits above the collector plate 22.

Leaving the impact separator 20, the molten slag 21 is water-quenched by a plurality of nozzles 51 of the quenching zone 50. This cools the slag until it is substantially solid pieces 54. These pieces 54 drop into a water bath 53. A moving chain conveyer 62 in the bottom of the water bath 53 moves the chunks of slag 54 to a series of roller crushers 61 in the slurrying processing region 60. The crushed slag is slurried in water, preferably with impeller 63 and allowed to return to atmospheric pressure by passing out of the apparatus through a pressure let-down valve 64. In a further embodiment of the invention, the slurry exiting the pressure let-down valve 64 is fed into a recycling zone 70. The slurry is preferably pumped employing pump 75 into a settling tank 71. The settling tank 71 separates out the water 72 from the slag particles 73, to enable the removal of slag tailings and the recirculation of water back to the system. The slag tailings can be removed in a road or rail vehicle 74, or equivalent conveyer or transportation means. The recycled water can be pumped via pump 76 and 78 and heat exchanger 77 either back into the slurrying step or back into nozzles 51 for quenching molten slag 21.

At the top of the slag separator, the hot gases having been freed of their loading of slag particles, pass on into the final, or lean combustion zone 30. Here they are mixed with compressor discharge air 34, through bellmouth scoops 35, in a can-type combustor, re-ignited, and burned to completion, this time in a lean-burn mode. Discharge air from the combustion turbine compressor exit (not shown) passes into annulus 45 which is circumscribed by the combustion turbine cylinder 42, which carries it to the annular duct 34. Compressor discharge air is removed through nozzles 31 and conveyed through pipes not shown into injectors 11 for primary zone operation. The combustion gases 33 exiting the combustion chamber 32 of the final combustion zone 30 then pass to the annular duct 41, circumscribed by the metal cylinder 46, which carries them to the expander inlet Not shown in FIG. 1, is the second slagging combustor apparatus, which is a mirror image of the first one shown. Combustion gases 44, are received from the second slagging combustor apparatus. Approximately half the compressed air exiting from the combustion turbine compressor 43, feeds the second slagging combustor.

From the foregoing it can be realized that this invention provides an improved direct coal-fired gas turbine system and method for its operation. These methods and systems provide cost efficient and continuous removal of combustion slag products. Although various embodiments have been illustrated, this was for the purpose of describing but not limiting the invention. Various modifications, which will become apparent to one skilled in the art, are within the scope of this invention described in the attached claims.

What is claimed:

1. In a direct coal-fired gas turbine system of the type having a primary combustion compartment coupled to an impact separator for removing molten slag from hot combustion gases, said hot combustion gases ducted to an expander section of said gas turbine, the improvement comprising:
   (a) quenching means for solidifying said molten slag removed by said impact separator; and
   (b) processing means for forming a slurry from said solidified slag for facilitating removal of said solidified slag from said system.

2. The system of claim 1 wherein said quenching means comprises nozzle means for applying a water spray to said molten slag for aiding in the solidification of said molten slag.

3. The system of claim 2 further comprising a water bath for receiving at least said solidified slag.

4. The system of claim 3 wherein said processing means comprises crusher means for crushing said solidified slag into slag particles.

5. The system of claim 4 further comprising conveyer means for transferring said solidified slag to said crushing means.

6. The system of claim 5 further comprising compressor means for creating an operating pressure greater than atmospheric pressure within said system.

7. The system of claim 6 further comprising pressure let-down valve means for releasing said slurry into atmospheric pressure.

8. The system of claim 7 wherein said processing means further comprises slurrying means for combining said slag particles with water to form said slurry.

9. The system of claim 8 further comprising a settling tank for receiving said slurry from said pressure let-down valve means and for substantially separating said water from said slag particles.

10. The system of claim 9 further comprising recirculation means for pumping a portion of said water from said settling tank to said nozzle means or said slurrying means.

11. A direct coal-fired gas turbine system, comprising:
   (a) a primary combustion zone for burning coal in the presence of compressed air to produce molten slag and hot combustion gases;
   (b) an impact separator for substantially removing said molten slag from said hot combustion gases;
   (c) quenching means comprising a spray nozzle for applying a water spray to said molten slag for aiding in the solidification of said molten slag, and a water bath for receiving at least said solidified molten slag; and
   (d) processing means for forming a slurry from said solidified slag for facilitating removal of said solidified slag from said system, said processing means including a crushing mechanism for crushing said solidified slag into slag particles, and means for transferring said solidified slag from said water bath to said crushing mechanism.

12. A method for removing slag from a direct coal-fired gas turbine system of the type having a primary combustion compartment coupled to an impact separator, comprising
   (a) quenching said molten slag removed by said impact separator with water; and
   (b) forming a slurry from said solidified slag for facilitated removal of said solidified slag from said system.

13. The method of claim 12 wherein said quenching step comprises applying a water spray to said molten slag for aiding in the solidification of said molten slag.

14. The method of claim 13 wherein said quenching step further comprises immersing at least said solidified slag in a water bath.

15. The method of claim 14 wherein said forming step (b) comprises crushing said solidified slag into slag particles.

16. The method of claim 15 wherein said forming step (b) comprises continuously transferring said solidified slag between said immersing and crushing steps.

17. The method of claim 12 further comprising providing compressed air to create an operating pressure for said system greater than atmospheric pressure.

18. The method of claim 17 further comprising releasing said slurry into atmospheric pressure without substantially affecting the operating pressure of said system.

19. The method of claim 18 further comprising combining said slag particles with water to form said slurry.

20. The method of claim 19 further comprising separating at least a portion of said water added by said combining step from said slag particles.

21. The method of claim 20 further comprising recirculating a portion of the water separated from said slag particles to said quenching step or said combining step.

* * * * *